(12) United States Patent
Wang

(10) Patent No.: US 12,388,378 B2
(45) Date of Patent: Aug. 12, 2025

(54) BRUSHLESS MOTOR DRIVING DEVICE, DRIVING METHOD FOR A BRUSHLESS MOTOR, AND BRUSHLESS MOTOR

(71) Applicants: Kabushiki Kaisha Toshiba, Tokyo (JP); Toshiba Electronic Devices & Storage Corporation, Tokyo (JP)

(72) Inventor: Shen Wang, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 35 days.

(21) Appl. No.: 18/480,227

(22) Filed: Oct. 3, 2023

(65) Prior Publication Data

US 2024/0039436 A1 Feb. 1, 2024

Related U.S. Application Data

(63) Continuation of application No. 17/381,159, filed on Jul. 20, 2021, now Pat. No. 11,817,810.

(30) Foreign Application Priority Data

Mar. 10, 2021 (JP) .................. 2021-038557

(51) Int. Cl.
*B28D 1/14* (2006.01)
*H02P 6/16* (2016.01)
(52) U.S. Cl.
CPC ..................... *H02P 6/16* (2013.01)
(58) Field of Classification Search
CPC .... H02P 6/16; H02P 6/12; B28D 1/14; H02H 1/0084
See application file for complete search history.

(56) References Cited

U.S. PATENT DOCUMENTS

| 5,034,622 A * | 7/1991 | Kuzmik ............... H02H 1/0084 318/434 |
| 9,562,792 B2 | 2/2017 | Kojima et al. |
| 2010/0084950 A1* | 4/2010 | Onozawa ................ H02P 6/153 310/68 B |
| 2010/0264862 A1 | 10/2010 | Kitagawa |

(Continued)

FOREIGN PATENT DOCUMENTS

| CN | 106788062 A | 5/2017 |
| DE | 102016211413 A1 | 12/2017 |

(Continued)

OTHER PUBLICATIONS

Combined First Office Action and Search Report mailed Mar. 11, 2025 in the corresponding Chinese Patent Application No. 202110818263.3, with English machine translation, 15 pages.

*Primary Examiner* — Cortez M Cook
(74) *Attorney, Agent, or Firm* — Kim & Stewart LLP

(57) ABSTRACT

According to one embodiment, a motor driving device includes an output part that supplies an exciting current to an exciting coil, a position detection part that detects a rotational position of a rotor, and a driving control part that produces a driving signal that is based on a detection signal from the position detection part and supplies it to the output part. The position detection part has first, second, and third detection elements that are integrally integrated together with the driving control part and detect rotational positions of the rotor.

21 Claims, 13 Drawing Sheets

(56) References Cited

U.S. PATENT DOCUMENTS

| | | | |
|---|---|---|---|
| 2012/0268047 A1 | 10/2012 | Suzuki et al. | |
| 2015/0034348 A1 | 2/2015 | Yoshida et al. | |
| 2015/0137718 A1* | 5/2015 | Liu | H02P 6/12 318/400.03 |
| 2015/0311837 A1 | 10/2015 | Kojima et al. | |
| 2016/0241172 A1 | 8/2016 | Leman et al. | |
| 2018/0086308 A1 | 3/2018 | Kimura et al. | |
| 2018/0183361 A1 | 6/2018 | Kadoya et al. | |
| 2018/0234040 A1 | 8/2018 | Yokozawa | |
| 2018/0248504 A1 | 8/2018 | Lin et al. | |
| 2019/0363651 A1 | 11/2019 | Wang et al. | |
| 2021/0205974 A1* | 7/2021 | Hashimoto | B28D 1/14 |

FOREIGN PATENT DOCUMENTS

| | | |
|---|---|---|
| JP | 2001-078392 A | 3/2001 |
| JP | 2001211685 A | 8/2001 |
| JP | 2005012955 A | 1/2005 |
| JP | 2008-118830 A | 5/2008 |
| JP | 2011-235541 A | 11/2011 |
| JP | 2012-217301 A | 11/2012 |
| JP | 2013-223317 A | 10/2013 |
| JP | 2015-215344 A | 12/2015 |
| JP | 2016-220521 A | 12/2016 |
| JP | 2017-011902 A | 1/2017 |

\* cited by examiner

BRUSHLESS MOTOR DRIVING DEVICE, DRIVING METHOD FOR A BRUSHLESS MOTOR, AND BRUSHLESS MOTOR

CROSS-REFERENCE TO RELATED APPLICATIONS

The present application is a continuation of U.S. patent application Ser. No. 17/381,159, filed on Jul. 20, 2021, which application is based upon and claims the benefit of priority to Japanese Patent Application No. 2021-038557 filed on Mar. 10, 2021, the entire contents of which are incorporated by reference in the present application.

FIELD

Embodiments described herein generally relate to a brushless motor driving device, a driving method for a brushless motor, and a brushless motor.

BACKGROUND

A technique of a three-phase brushless motor has conventionally been disclosed where three sensors that detect a rotational position of a rotor are arranged at positions with mutual phase differences of 120 degrees as an electrical angle. Three sensors are provided separately, so that the number of components is increased. Furthermore, three sensors are mounted at positions with mutual phase differences of 120 degrees, so that a support base with large surface area for mounting the sensors thereon is needed and a cost of a motor is increased. Furthermore, adjustment of arrangement positions of sensors is needed for each motor and is complicated. On the other hand, in a case where one sensor is provided, there is a risk of defective activation of a motor. A brushless motor driving device, a driving method for a brushless motor, and a brushless motor are desired that are of high versatility and are also capable of reducing a cost of a motor.

DETAILED DESCRIPTION

According to one embodiment, a motor driving device includes an output part that supplies an exciting current to an exciting coil that generates a magnetic field that rotates a rotor, a position detection part that detects a rotational position of the rotor, and a driving control part that produces a driving signal that is based on a detection signal from the position detection part and supplies it to the output part, wherein the position detection part has a first detection element that detects a rotational position of the rotor, a second detection element that detects a rotational position of the rotor prior to the first detection element, and a third detection element that detects a rotational position of the rotor subsequent to the first detection element, and the first to third detection elements are integrally integrated.

Hereinafter, a brushless motor driving device, a driving method for a brushless motor, and a brushless motor according to an embodiment will be explained in detail with reference to the accompanying drawings. Additionally, the present invention is not limited by these embodiments.

First Embodiment

Figure 1:
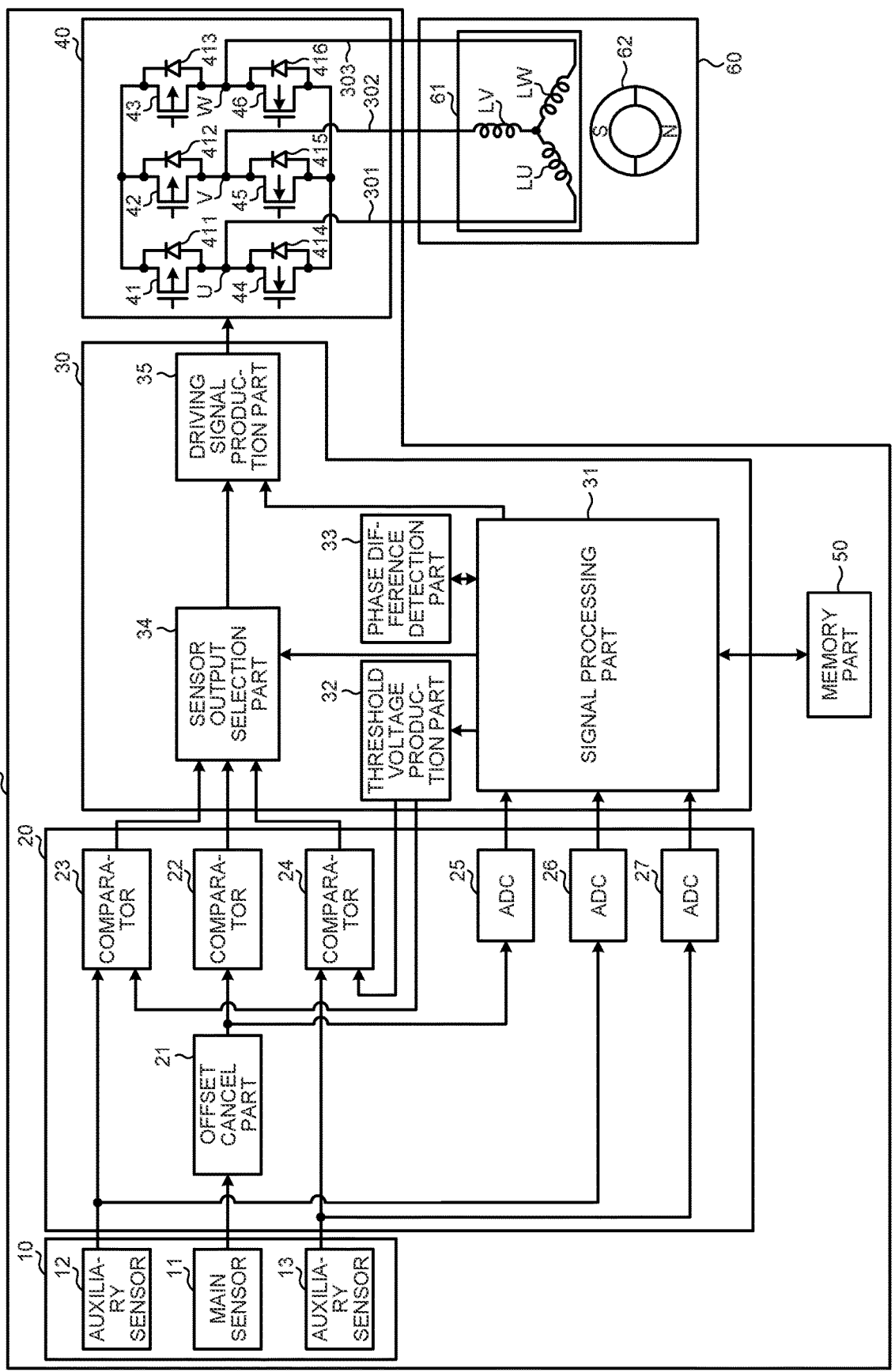
FIG. 1 is a diagram that generally illustrates a circuit configuration of a brushless motor driving device according to a first embodiment.

FIG. 1 is a diagram that generally illustrates a circuit configuration of a brushless motor driving device 100 according to a first embodiment. The brushless motor driving device 100 according to the present embodiment (that will be called a driving device 100 below) has a sensor part 10. The sensor part 10 has a main sensor 11, an auxiliary sensor 12, and an auxiliary sensor 13. For example, each of the sensors 11, 12, and 13 is composed of a Hall element or is configured as an integrated circuit that includes an amplifier circuit (non-illustrated) that amplifies an output signal of a Hall element.

It is possible to provide a Hall element of each of the sensors 11, 12, 13 that is composed of silicon or a compound semiconductor such as GaAs or InAs. In a case where a Hall element is composed of silicon, it is possible to integrate it on a single silicon substrate (non-illustrated) together with other circuit parts that compose the driving device 100. In a case where a Hall element is composed of a compound semiconductor, it is possible to integrate a separate chip (non-illustrated) where a Hall element that is composed of a compound semiconductor is formed with a silicon substrate where other circuit parts are formed, by a multichip configuration, and integrally integrate them by, for example, a mold resin.

The driving device 100 according to the present embodiment has a detection part 20. The detection part 20 has an offset cancel part 21 where an output signal of the main sensor 11 is supplied. It is possible to provide, for example, the offset cancel part 21 that is configured to subtract an output signal that is obtained by changing a direction of a current that is supplied to a Hall element (non-illustrated) of the main sensor 11. An output signal of the offset cancel part 21 is supplied to a comparator 22. For example, the comparator 22 has a hysteresis characteristic and outputs a digital signal where an H level and an L level are changed at a zero cross point. The comparator 22 has a hysteresis characteristic, so that it is possible to provide a configuration to prevent chattering.

Output signals of the auxiliary sensors 12, 13 are supplied to comparators 23, 24, respectively. The comparators 23, 24 compare output signals of the auxiliary sensors 12, 13 with predetermined thresholds and output digital signals that are changed to an H level or an L level depending on results of comparison thereof. The comparators 23, 24 are composed of, for example, window comparators that compare input signals with two threshold voltages and output digital signals at an H level or an L level depending on results of comparison thereof. A relationship between setting of threshold voltages that are supplied to the comparators 23, 24 and output signals of the comparators 23, 24 will be described later.

The detection part 20 has an AD converter 25 where an output of the offset cancel part 21 is supplied, and AD converters 26, 27 where output signals of the auxiliary sensors 12, 13 are supplied. The respective AD converters 25 to 27 convert output signals of the respective sensors 11, 12, and 13 into digital signals and output them.

The driving device 100 according to the present embodiment has a control part 30. The control part 30 has a signal processing part 31, a threshold voltage production part 32, a phase difference detection part 33, a sensor output selection part 34, and a driving signal production part 35.

The signal processing part 31 executes a predetermined arithmetic process by using an output signal of the respective AD converters 25 to 27. For example, the signal processing part 31 executes an arithmetic process by using digital signals that are acquired from the respective AD converters 25 to 27 and supplies a result of processing thereof to the threshold voltage production part 32, the phase difference detection part 33, and the driving signal production part 35.

The driving device 100 according to the present embodiment has a memory part 50. The memory part 50 holds results of selection of the auxiliary sensors that are acquired in calibration that is executed at a time of motor activation and values of output signals of the auxiliary sensors 12, 13. Furthermore, the memory part 50 holds data of a driving condition in calibration at a time of activation thereof. The driving signal production part 35 produces a driving signal that rotates a rotor 62 at a constant frequency (rotational frequency), for example, in response to a signal that is supplied at a predetermined timing from the memory part 50 through the signal processing part 31 in calibration thereof.

The threshold voltage production part 32 analog-converts a digital signal that is supplied from the signal processing part 31, produces threshold voltages of the comparators 23, 24 from output signals of the AD converters 26, 27 that are acquired in calibration that is executed at a time of motor activation, and supplies them to the comparators 23, 24. Calibration will be described later.

The phase difference detection part 33 detects phase differences among output signals of the respective sensors 11, 12, 13 that are supplied from the signal processing part 31. An output signal of the phase difference detection part 33 is supplied to the sensor output selection part 34 through the signal processing part 31.

The sensor output selection part 34 selects a signal that is supplied to the driving signal production part 35, in response to an output signal of the phase difference detection part 33 that is supplied through the signal processing part 31. In a case where a phase difference between an output signal of the main sensor 11 and an output signal of the auxiliary sensor 12 at a time of normal rotation of the rotor 62 is a predetermined threshold or less, the sensor output selection part 34 selects output signals from the main sensor 11 and the auxiliary sensor 12 and supplies them to the driving signal production part 35. A threshold is, for example, 30 degrees as an electrical angle. A threshold and a selection method for an output signal will be described later.

The driving signal production part 35 produces a driving signal by using a signal that is supplied from the sensor output selection part 34 and supplies it to an output circuit part 40.

The output circuit part 40 has output transistors 41 to 46. The respective output transistors 41 to 46 have free wheel diodes 411 to 416 between sources-drains thereof. The respective output transistors 41 to 46 of the output circuit part 40 compose a bridge circuit and execute, for example, 120-degree conduction in response to a driving signal from the driving signal production part 35. The respective output transistors 41 to 46 supply exciting currents to exciting coils LU, LV, LW of a coil part 61 of a motor 60 through output lines 301 to 303. The exciting coils LU, LV, LW are excited by exciting currents so as to generate magnetic fields. The rotor 62 that is composed of a permanent magnet is rotated depending on magnetic fields that are generated by the exciting coils LU, LV, LW. Additionally, the exciting coils LU, LV, LW may be composed of delta connection. The driving device 100 that includes the sensor part 10 is arranged at a position that is close to the rotor 62 of the motor 60.

In the driving device 100 according to a first embodiment, the main sensor 11, the auxiliary sensor 12, and the auxiliary sensor 13 are integrally integrated. Furthermore, in the driving device 100, results of selection of the auxiliary sensors 12, 13 that are acquired at a time of calibration and values of output signals of the respective auxiliary sensors 12, 13 are held in the memory part 50 and the threshold voltage production part 32 sets threshold voltages of the respective comparators 23, 24. Therefore, it is possible to change setting values of threshold voltages for each motor where the driving device 100 is mounted, so that a configuration with high versatility is provided.

Figure 2:
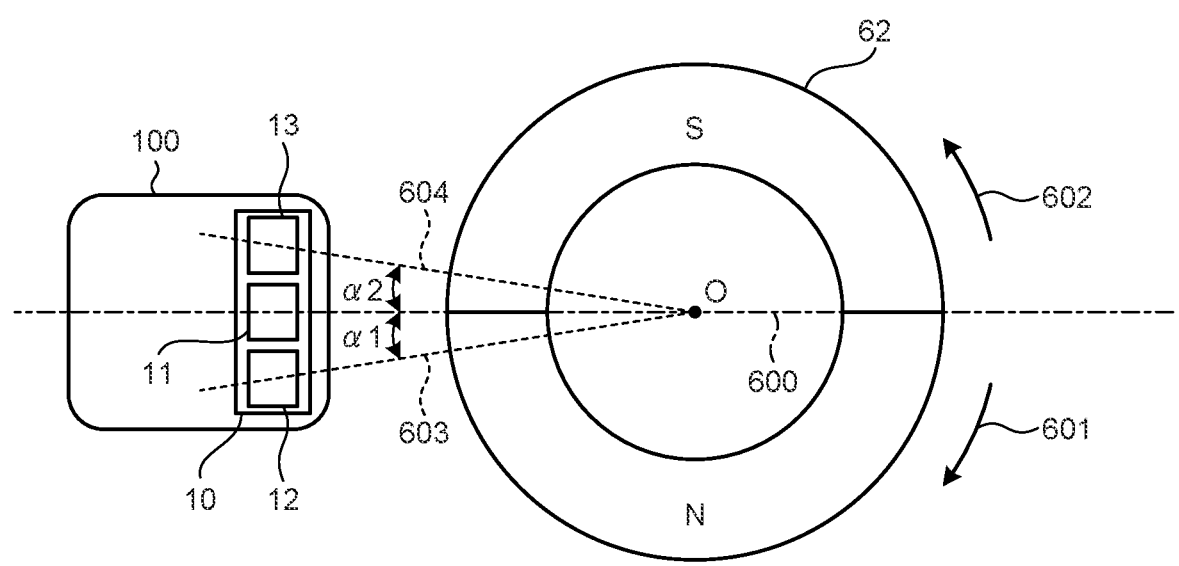
FIG. 2 is a diagram that schematically illustrates an arrangement relationship between a brushless motor driving device and a rotor.

FIG. 2 is a diagram that schematically illustrates an arrangement relationship between the driving device 100 and the rotor 62. A component that corresponds to that of an embodiment as already described will be provided with an identical sign so as to provide a redundant description only in a case of need. Hereinafter, the same applies. FIG. 2 illustrates an example of a case of an inner rotor. For example, the rotor 62 is composed of two poles such as an N pole and an S pole as illustrated in the figure. The driving device 100 where the respective sensors 11, 12, 13 of the sensor part 10 are integrally integrated is provided so as to be close to the rotor 62. A center line 600 passes through a center of the main sensor 11. A broken line 603 indicates a line that passes through a center of the auxiliary sensor 12 from a center O of the rotor 62 and a broken line 604 indicates a line that passes through a center of the auxiliary sensor 13 from the center O.

Phase differences between an output signal of the main sensor 11 and output signals of the respective auxiliary sensors 12, 13 are produced by angles α1, α2 that are produced between the center line 600 and the respective broken lines 603, 604. Preferably, the auxiliary sensors 12, 13 are provided at line-symmetric positions relative to the main sensor 11, that is, the center line 600 as a center. That is, arrangement is provided in such a manner that α1 and α2 are equal. The auxiliary sensors 12, 13 are arranged at line-symmetric positions relative to the center line 600 as a center, so that it is possible to provide a configuration that has a relationship where a phase of an output signal of one of the auxiliary sensors 12, 13 is advanced relative to that of an output signal of the main sensor 11 and an output signal of the other is delayed by an identical phase difference.

At a time of normal rotation of the rotor 62 as indicated by an arrow 601, the auxiliary sensor 12 outputs an output signal that precedes the main sensor 11 and the auxiliary sensor 13 outputs an output signal that follows it. At a time of reverse rotation as indicated by an arrow 602, the auxiliary sensor 13 outputs an output signal that precedes the main sensor 11 and the auxiliary sensor 12 outputs an output signal that follows the main sensor 11. The driving device 100 according to the present embodiment detects a rotational position of the rotor 62 by utilizing phase differences between output signals of the main sensor 11 and the auxiliary sensors 12, 13. Furthermore, an anteroposterior relation between output signals of the main sensor 11 and the auxiliary sensors 12, 13 differs depending on a direction of rotation of the rotor 62, so that it is possible to detect a direction of rotation of the rotor 62 and it is possible to avoid a risk of defective activation of the motor 60. Additionally, rotation of the rotor 62 may be represented as rotation of the motor 60.

Output signals of the respective sensors 11, 12, and 13 are generated in response to approaching of an N pole and an S pole of a permanent magnet of the rotor 62 to the respective sensors 11, 12, and 13. That is, a magnitude of an output signal of each of the sensors 11, 12, and 13 does not depend on a rotational speed of the rotor 62. Therefore, levels of output signals of the respective auxiliary sensors 12, 13 that are acquired by calibration that is executed at a time of activation thereof are set as threshold voltages of the comparators 23, 24 and output signals from the respective auxiliary sensors 12, 13 are compared with these threshold voltages in the respective comparators 23, 24, so that it is possible to detect a rotational positon of the rotor 62.

Additionally, in a case of a configuration of an outer rotor, the driving device 100 is arranged on an inner side of the rotor 62, that is, on a side of the center O. Similarly to a configuration of an inner rotor, it is possible to provide a configuration that causes the respective sensors 11, 12, 13 to respond to rotation of the rotor 62.

Figure 3:
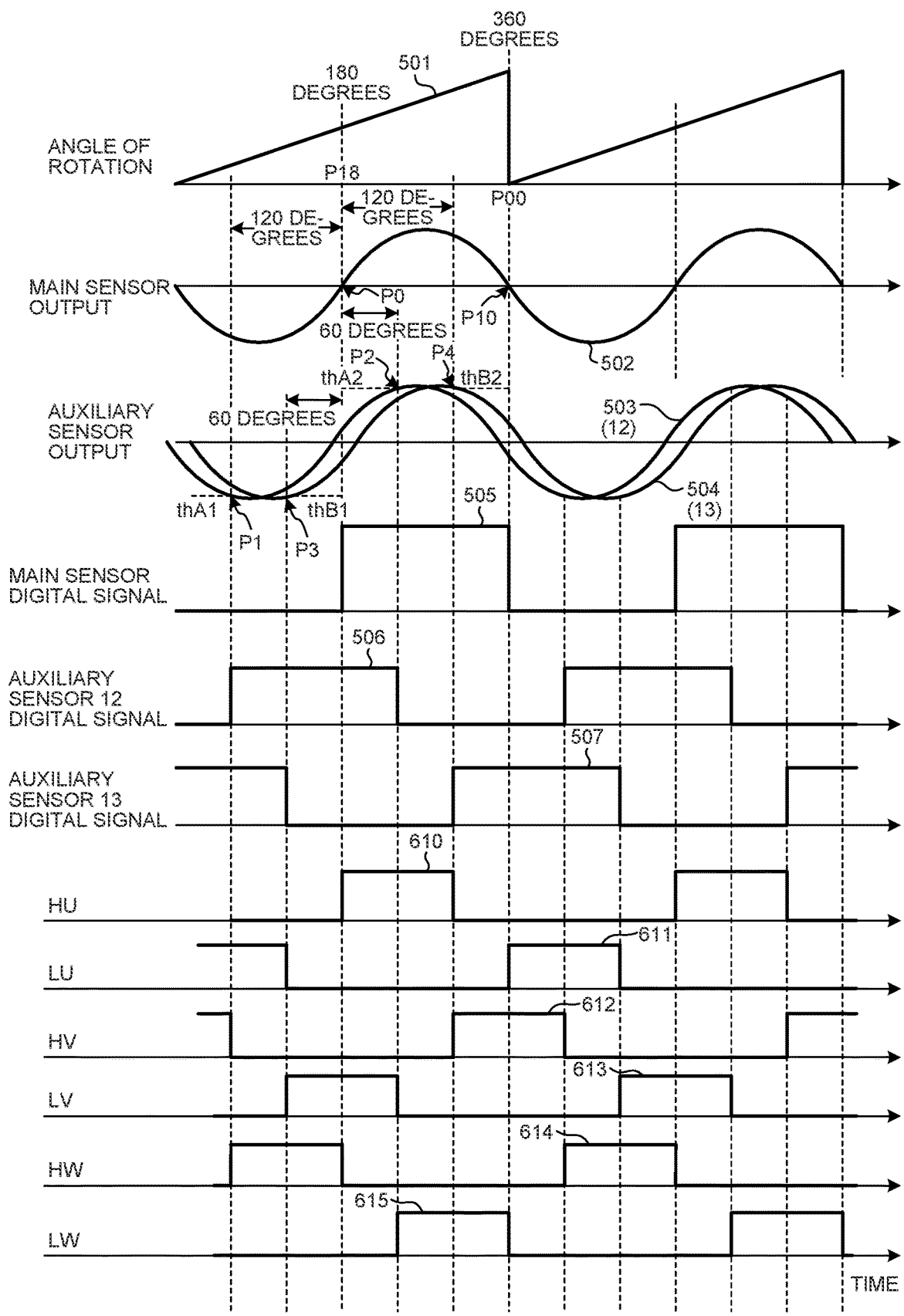
FIG. 3 is a diagram for explaining a driving method for a brushless motor driving device.

Next, a driving method for the driving device 100 will be explained by using FIG. 3. FIG. 3 is a diagram for explaining a driving method for a brushless motor driving device, and a diagram for explaining a relationship among output signals of the respective sensors 11, 12, and 13 at a time of normal rotation of the rotor 62. A solid line 501 in a top section indicates an angle of rotation of the rotor 62. In a case where the rotor 62 is composed of a permanent magnet with two poles, an angle of rotation of the rotor 62 corresponds to an electrical angle. P18 indicates a timing of an angle of rotation of 180 degrees and P00 indicates a timing of an angle of rotation of 360 degrees, therefore, an angle of rotation of 0 degrees.

A subsequent section indicates an output signal 502 of the main sensor 11 that is supplied through the offset cancel part 21, as a pseudo-sine wave. For example, the main sensor 11 generates a negative voltage as an N pole of the rotor 62 approaches, or generates a positive voltage as an S pole thereof approaches. The output signal 502 of the main sensor 11 is zero at timings of connection of an S pole and an N pole of the rotor 62. That is, the output signal 502 of the main sensor 11 is zero at timings P0, P10 that correspond to timings of connection of an S pole and an N pole of the rotor 62. The timings P0, P10 are zero cross points.

A subsequent section indicates output signals 503, 504 of the auxiliary sensors 12 and 13, as pseudo-sine waves. Conveniently, indices (12), (13) that indicate the auxiliary sensors 12, 13 that correspond to the output signals 503, 504 are additionally provided. For example, the auxiliary sensors 12, 13 generate negative voltages as an N pole of the rotor 62 approaches, or generate positive voltages as an S pole thereof approaches, similarly to the main sensor 11. The output signal 503 of the auxiliary sensor 12 is compared with a threshold voltage thA1 and a threshold voltage thA2 in the comparator 23. Depending on results of comparison with the threshold voltages thA1, thA2, a timing P1 when a phase is advanced by 120 degrees relative to a timing P18 when the output signal 502 of the main sensor 11 is zero, and a timing P2 when a phase is delayed by 60 degrees relative thereto are detected.

Similarly, the output signal 504 of the auxiliary sensor 13 is compared with a threshold voltage thB1 and a threshold voltage thB2 in the comparator 24, and a timing P3 when a phase is advanced by 60 degrees relative to the timing P18 when the output signal 502 of the main sensor 11 is zero and a timing P4 when a phase is delayed by 120 degrees are detected. For example, the respective threshold voltages thA1, thA2, thB1, thB2 are set based on output levels of output signals of the respective auxiliary sensors 12, 13 at a time of calibration that is executed at a time of activation of the motor 60. Calibration will be described later.

A subsequent section indicates a digital signal 505 that is produced from the output signal 502 of the main sensor 11. A waveform of the output signal 502 of the main sensor 11 that is supplied through the offset cancel part 21 is shaped by the comparator 22 so as to obtain the digital signal 505. The digital signal 505 is changed from an L level to an H level at the timing P0 when the output signal 502 is changed from a negative voltage to a positive voltage, that is, a zero cross point. For example, the comparator 22 has a hysteresis characteristic where switching between an H level and an L level is caused at a zero cross point of the output signal 502.

A subsequent section indicates a digital signal 506 of the auxiliary sensor 12 that is output by the comparator 23. For example, the comparator 23 outputs the digital signal 505 at an H level and an L level in response to the threshold voltage thA1 on a low side and the threshold voltage thA2 on a high side.

A subsequent section indicates a digital signal 507 of the auxiliary sensor 13 that is output by the comparator 24. For example, the comparator 24 outputs a digital signal at an H level and an L level in response to the threshold voltage thB1 on a low side and the threshold voltage thB2 on a high side.

The threshold voltages thA1, thA2, thB1, thB2 of the respective sensors 12, 13 are set in calibration at a time of motor activation. The threshold voltages thA1, thA2, thB1, thB2 are set based on output levels of output signals of the auxiliary sensors 12, 13 at a timing when a relationship is provided in such a manner that respective phase differences of electrical angles are 120 degrees, in the output signal 502 of the main sensor 11.

The driving signal production part 35 produces driving signals HU, LU, HV, LV, HW, LW that are supplied to the respective output transistors 41 to 46, by using the three digital signals 505 to 507. The driving signal HU as indicated by a solid line 610 in a subsequent section is supplied to the output transistor 41 in an upper section for a U phase and the driving signal LU as indicated by a solid line 611 in a subsequent section is supplied to the output transistor 44 in a lower section for the U phase.

Similarly, the driving signal HV as indicated by a solid line 612 in a subsequent section is supplied to the output transistor 42 on an upper section for a V phase and the driving signal LV as indicated by a solid line 613 in a subsequent section is supplied to the output transistor 45 on a lower section for the V phase. Similarly, the driving signal HW as indicated by a solid line 614 in a subsequent section is supplied to the output transistor 43 on an upper section for a W phase and the driving signal LW as indicated by a solid line 615 in a subsequent section is supplied to the output transistor 46 on a lower section for the W phase.

The respective output transistors 41 to 46 are driven by the driving signals HU, LU, HV, LV, HW, LW, for example, in 120-degree conduction. Additionally, for explanatory convenience, the driving signals HU, HV, HW indicate signals for turning on P-type output transistors 41 to 43, so that indication is provided in such a manner that a logic level of H/L is inverted.

In the driving device 100 according to the present embodiment, the driving signals HU, LU, HV, LV, HW, LW are produced based on output levels of output signals of the main sensor 11 and the two auxiliary sensors 12, 13 that are integrally integrated. The threshold voltages thA1, thA2, thB1, thB2 of the comparators 23, 24 are set by output levels of output signals of the auxiliary sensors 12, 13 that are detected at a point of time for a predetermined phase difference relative to an output signal of the main sensor 11 at a time of calibration that is executed at a time of activation of the motor 60. Output signals from the auxiliary sensors 12, 13 are compared with threshold voltages, so that it is possible to detect a rotational position of the rotor 62. Even though the main sensor 11 and the auxiliary sensors 12, 13 are formed integrally, it is possible to detect a rotational position of the rotor 62 similarly to a conventional three-phase brushless motor. Furthermore, it is possible to set proper threshold voltages for each motor in calibration, so that it is possible to provide the driving device 100 with versatility.

Figure 4:
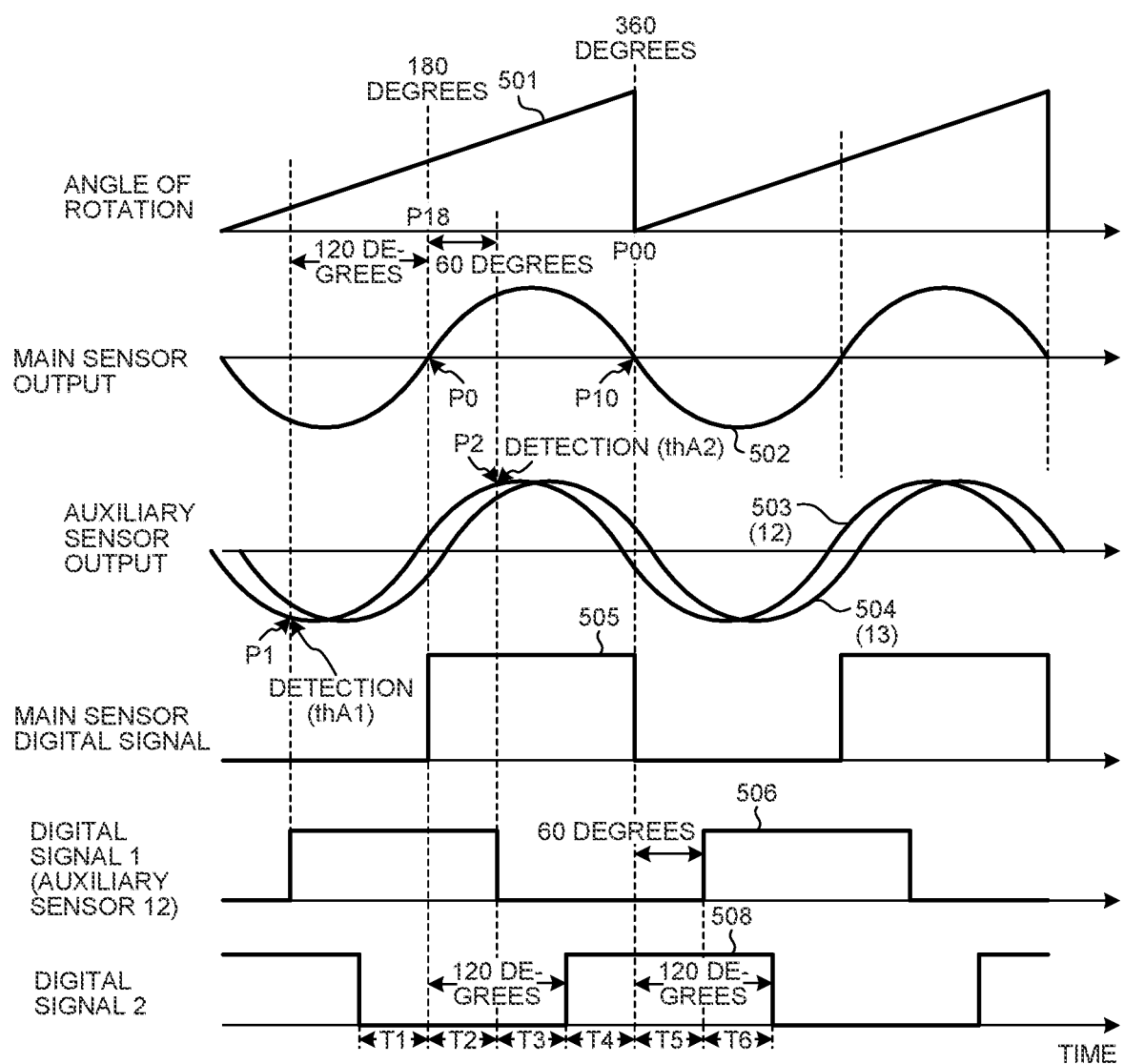
FIG. 4 is a diagram for explaining a production method for a driving signal of a brushless motor driving device at a time of normal rotation of a rotor.

Next, one embodiment of a production method for a driving signal that is executed by the driving device 100 at a time of normal rotation of the rotor 62 will be explained by using FIG. 4. FIG. 4 is a diagram for explaining output signals of the respective sensors 11, 12, 13 at a time of normal rotation of the rotor 62. Production of signals in a top section to a fifth section is identical to that of FIG. 3 as already described. In the present embodiment, a digital signal 2 is produced by using the digital signal 505 of the main sensor 11 and a digital signal 1 of the auxiliary sensor 12.

For example, a period of time T2 is measured that corresponds to a phase difference of 60 degrees between the timing P18 of rising of the digital signal 505 of the main sensor 11 and the timing P2 of falling of the digital signal 1 of the auxiliary sensor 12. Measurement is executed by, for example, a counter (non-illustrated) that is provided in the signal processing part 31. An arithmetic process is executed by using the measured period of time T2 in the signal processing part 31 so as to calculate periods of time T3, T1, and T4 to T6 that correspond to phase differences of 60 degrees. The digital signal 2 with a phase where the phase is delayed by 120 degrees relative to the digital signal 505 that is produced depending on the output signal 502 of the main sensor 11 is produced by using the measured period of time T2 and the calculated periods of time T1, T3 to T6. A total value of the periods of time T1 to T6 is one cycle of the digital signal 2. The digital signal 2 is produced in the driving signal production part 35.

Additionally, although it is also possible to execute an arithmetic process by using only the digital signal 505 of the main sensor 11 so as to produce the digital signal 2 with a phase where the phase is delayed by 120 degrees, it is possible to produce the digital signal 2 that is more accurate, by also using information of the auxiliary sensor 12. Furthermore, it is also possible to estimate the period of time T3 by using information of a frequency variation in several cycles.

In a signal production method according to the present embodiment, an arithmetic process is executed by using the digital signal 505 of the main sensor 11 and the digital signal 1 of the auxiliary sensor 12 so as to produce the digital signal 2 where an H level and an L level are changed at a timing of a predetermined phase difference. Specifically, the digital signal 2 as indicated by a solid line 508 is produced where a phase thereof is delayed by 120 degrees relative to the output signal 502 of the main sensor 11. A method that produces a driving signal by using the main sensor 11, the digital signal 1 of the auxiliary sensor 12, and the digital signal 2 is similar to that of an example of FIG. 3 and hence is omitted. The driving signals HU, LU, HV, LV, HW, LW are produced by the driving signal production part 35.

A signal production method where a production method for the digital signal 1 and the digital signal 2 differs depending on a phase difference between the output signal 502 of the main sensor 11 and the output signal 503 of the auxiliary sensor 12 will be described later.

Figure 5:
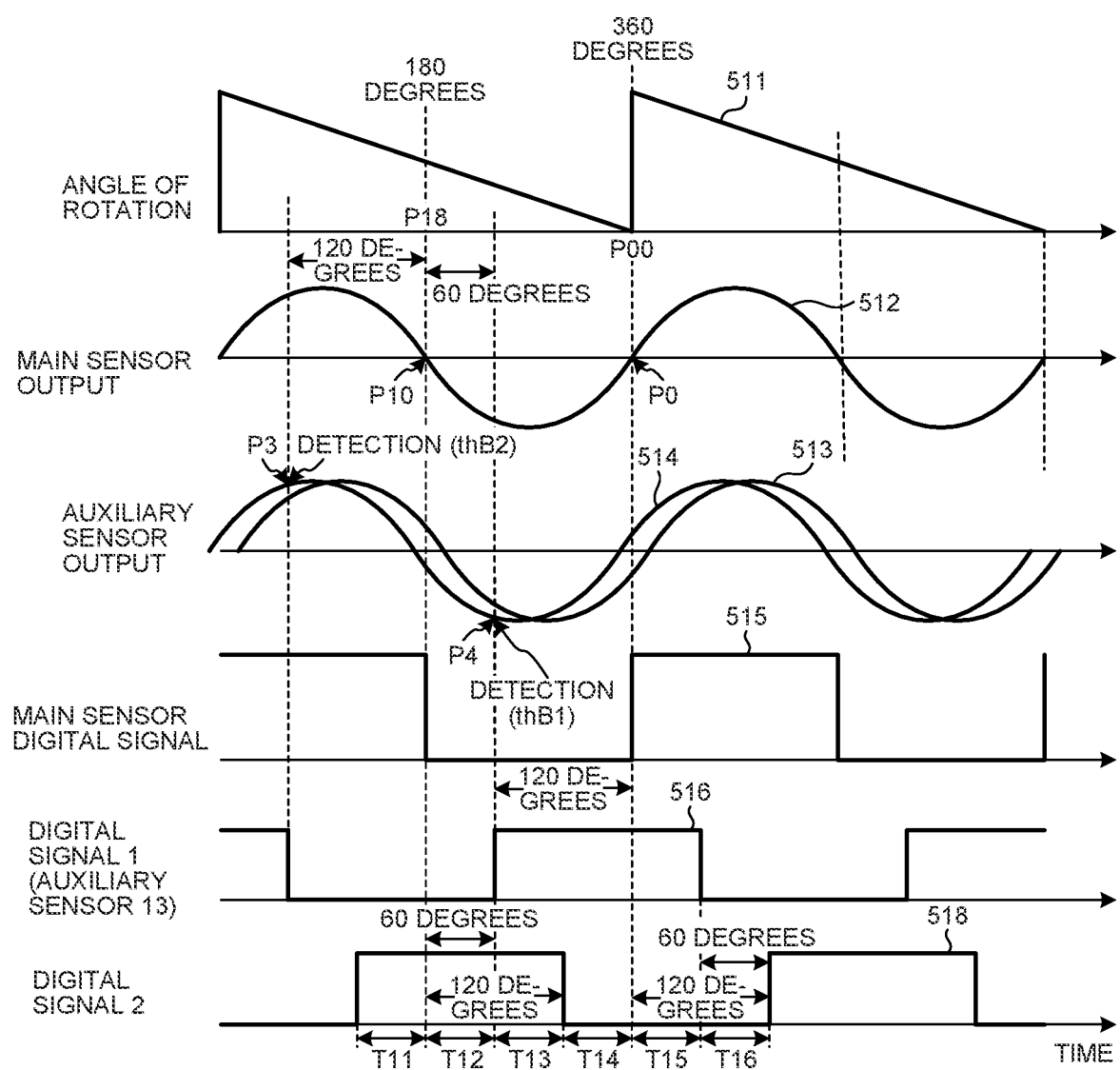
FIG. 5 is a diagram for explaining a production method for a driving signal of a brushless motor driving device at a time of reverse rotation of a rotor.

FIG. 5 is a diagram for explaining a production method for output signals of the respective sensors 11, 12, 13 and a driving signal at a time of reverse rotation of the rotor 62. A top section indicates an angle of rotation of the rotor 62 by a solid line 511. A subsequent section indicates an output signal 512 of the main sensor 11.

A subsequent section indicates output signals of the auxiliary sensors 12, 13 by solid lines 513, 514, respectively. A relationship between magnetic poles of a permanent magnet of the rotor 62 and output voltages of the respective sensors 11, 12, 13 is identical to that of a case of normal rotation of the rotor 62.

A subsequent section indicates, by a solid line 515, a digital signal of the main sensor 11 that is output by the comparator 22. Changes to an H level and an L level are caused at timings P0, P10 that are zero cross points for the main sensor 11. A subsequent section indicates, by a solid line 516, the digital signal 1 where a phase thereof is advanced by 120 degrees relative to a digital signal 515 of the main sensor 11. A digital signal 516 is produced from an output signal 514 of the auxiliary sensor 13.

That is, in calibration at a time of motor activation, a level of an output signal of the auxiliary sensor 13 at the timing P3 that is a point of time when a phase thereof is advanced by 120 degrees relative to an output signal of the main sensor 11 is detected and set as the threshold voltage thB2. Furthermore, an output level of an output signal at the timing P4 when a phase thereof is delayed by 60 degrees relative to the output signal 512 of the main sensor 11 is detected and set as the threshold voltage thB1. The digital signal 1 as indicated by the solid line 516 is produced by the comparator 24 where the threshold voltages thB1, thB2 are set.

In a signal production method according to the present embodiment, the digital signal 2 as indicated by a solid line 518 is produced by using the digital signal 515 of the main sensor 11 and the digital signal 1 of the auxiliary sensor 13. For example, a period of time T12 is measured that corresponds to a phase difference of 60 degrees between the timing P18 of falling of the digital signal 515 of the main sensor 11 and the timing P4 of rising of the digital signal 1 of the auxiliary sensor 13. Measurement is executed by, for example, a counter (non-illustrated) that is provided in the signal processing part 31. An arithmetic process is executed in the signal processing part 31 by using the measured period of time T12 so as to calculate period of times T13, T11, and T14 to T16 that correspond to phase differences of 60 degrees. The digital signal 2 with a phase where the phase is delayed by 120 degrees relative to the digital signal 515 that is produced depending on the output signal 512 of the main sensor 11 is produced by using the measured period of time T12 and the calculated periods of time T11, T13 to T16. A total value of the periods of time T11 to T16 is one cycle of the digital signal 2. The digital signal 2 is produced in the driving signal production part 35.

Additionally, although it is also possible to execute an arithmetic process by using only the digital signal 515 of the main sensor 11 so as to produce the digital signal 2 with a phase where the phase is delayed by 120 degrees, it is possible to produce the digital signal 2 that is more accurate, by also using information of the auxiliary sensor 13.

In a signal production method according to the present embodiment, an auxiliary sensor that produces the digital signal 1 depending on a direction of rotation of the rotor 62 is selected and timings when H/L of the digital signal 1 is switched are timings before output signals of the auxiliary sensor reach a peak value and a bottom value, so that it is possible to simplify a circuit configuration for producing the digital signal 1 from the output signals of the auxiliary sensor.

For example, it is possible to provide the comparator 24 that outputs the digital signal 516 from the auxiliary sensor 13 and is composed of a window comparator that compares the output signal 514 of the auxiliary sensor 13 with the two threshold voltages thB1, thB2. A method that produces the driving signals HU, LU, HV, LV, HW, LW by using the digital signal 515 of the main sensor 11, the digital signal 516 of the auxiliary sensor 13, and a digital signal 518 is similar to that of a case of an embodiment of FIG. 3 and hence is omitted.

A signal production method in a case where a phase difference between output signals of the main sensor 11 and the auxiliary sensor 12 at a time of normal rotation of the rotor 62 is a threshold or less will be explained by using FIG. 6 and FIG. 7. FIG. 7 is a diagram that enlarges and illustrates a top section to a third section of FIG. 6.

In calibration at a time of activation of the motor 60, a phase difference between the output signal 502 of the main sensor 11 and the output signal 503 of the auxiliary sensor 12 at a time of normal rotation of the rotor 62 is compared with a predetermined threshold. That is, a phase difference θ1 between the output signal 502 of the main sensor 11 as indicated in second sections of FIG. 6 and FIG. 7 and the output signal 503 of the auxiliary sensor 12 as indicated in third sections thereof is detected and compared with a threshold. A threshold is, for example, 30 degrees.

As enlarged and illustrated in FIG. 7, the phase difference θ1 between output signals of the main sensor 11 and the auxiliary sensor 12 is detected by a phase difference between a timing PU when the output signal 502 of the main sensor 11 is provided at a peak value and a timing PU12 when the output signal 503 of the auxiliary sensor 12 is provided at a peak value or a phase difference between a timing PB when the output signal 502 of the main sensor 11 is provided at a bottom value and a timing PB12 when the output signal 503 of the auxiliary sensor 12 is provided at a bottom value.

The timing PB when the output signal 502 of the main sensor 11 is provided at a bottom value is present at a position where the timing P18 that is advanced by 90 degrees relative to an angle of rotation of the main sensor 11 is 180 degrees. Therefore, in a case where the phase difference θ1 is 30 degrees or less, the timing P1 of the output signal 503 of the auxiliary sensor 12 that is advanced by 120 degrees relative to the timing P0 when the output signal 502 of the main sensor 11 is zero is present at a predetermined position before reaching the timing PB12 when the output signal 503 of the auxiliary sensor 12 is provided at a bottom value. Similarly, the timing P2 when a phase of the output signal 503 of the auxiliary sensor 12 is delayed by 60 degrees relative to the timing P0 when the output signal 502 of the main sensor 11 is zero is present at a predetermined position before reaching the timing PU12 when the output signal 503 of the auxiliary sensor 12 is provided at a peak value.

Therefore, it is possible to detect rotational positions of the rotor 62 at the timing P1 where a phase thereof is advanced by 120 degrees relative to the timing P18 when an angle of rotation of the main sensor 11 is 180 degrees and the timing P2 when a phase thereof is delayed by 60 degrees relative thereto, by a configuration where the output signal 503 of the auxiliary sensor 12 is compared with the threshold voltages thA1, thA2 that are set at a time of calibration. For example, it is possible to provide the comparator 23 that is composed of a window comparator that compares the output signal 503 of the auxiliary sensor 12 with the two threshold voltages thA1, thA2.

Figure 6:
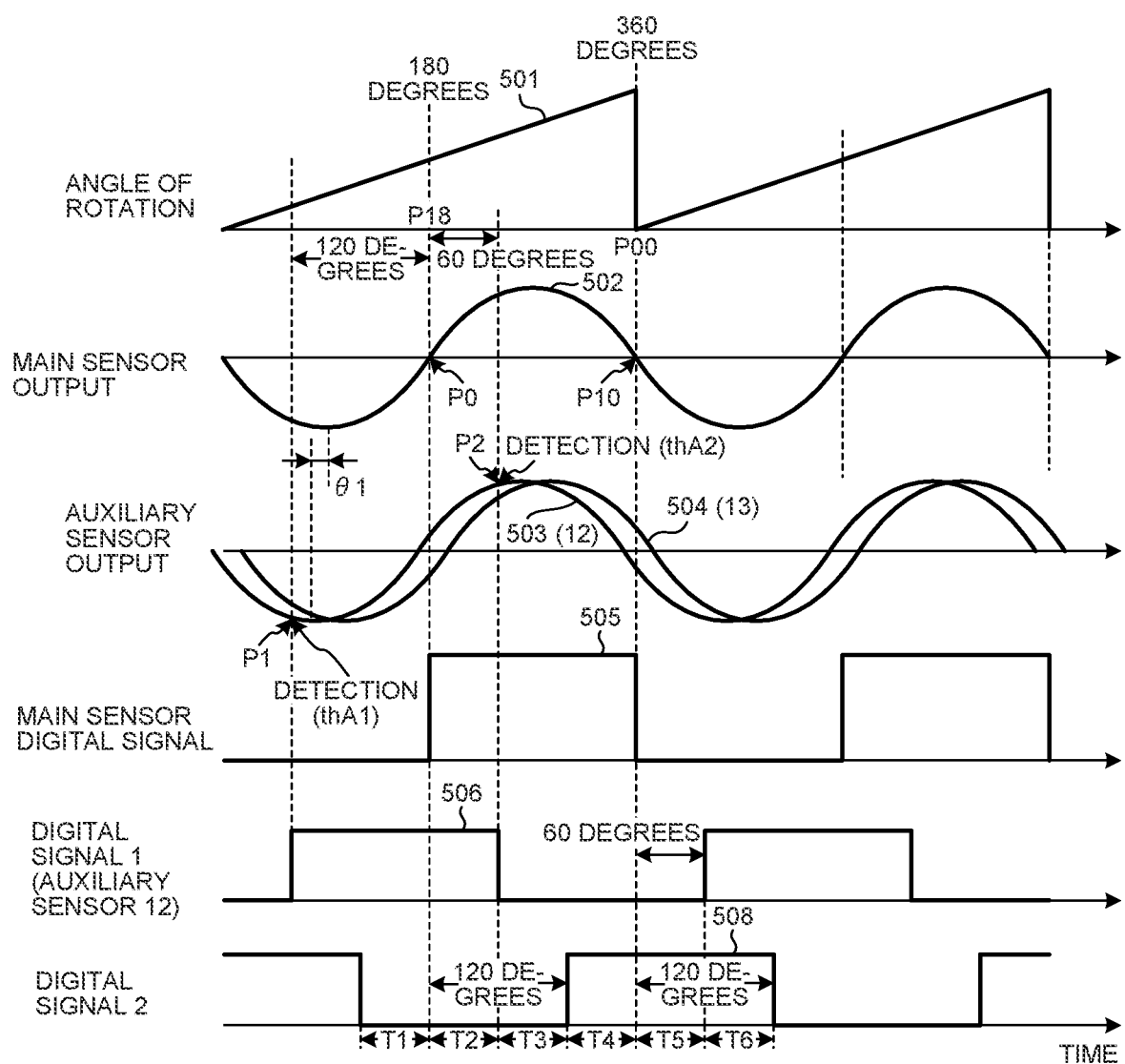
FIG. 6 is a diagram for explaining a signal production method in a case where a phase difference is a threshold or less.
Figure 7:
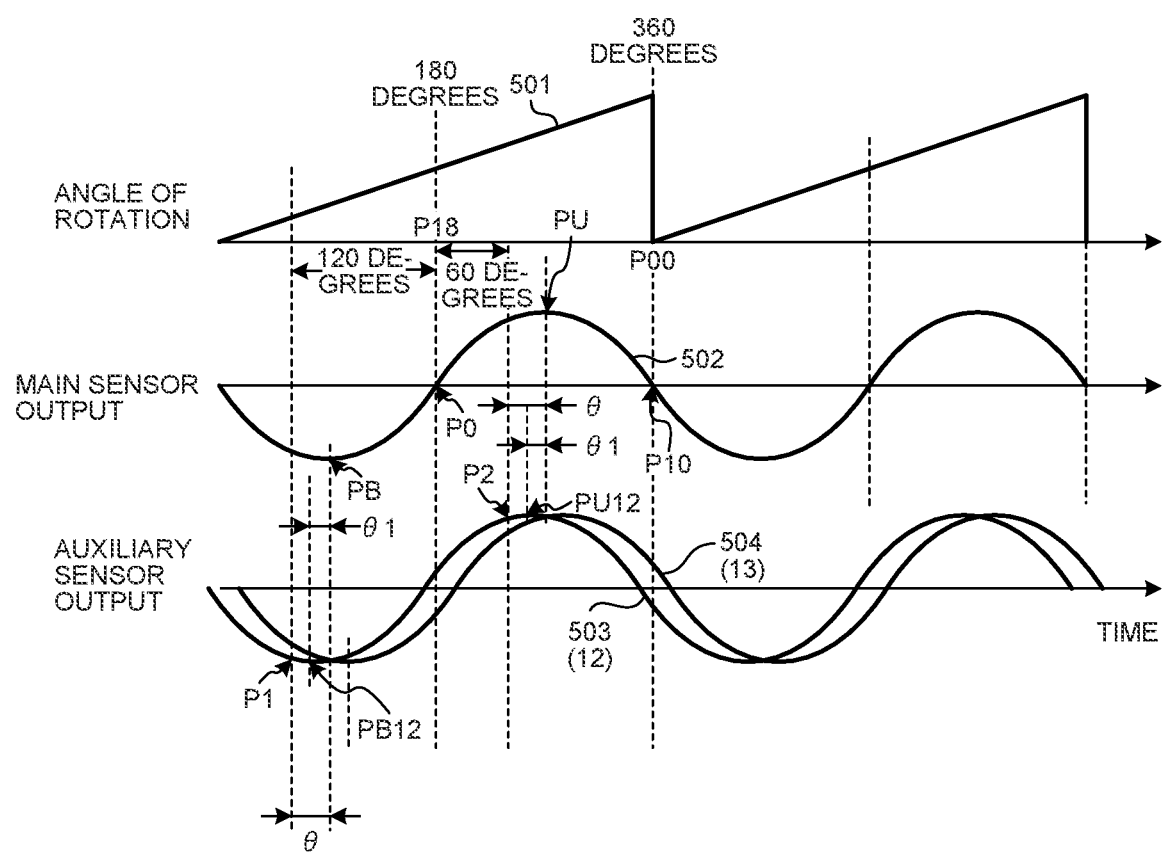
FIG. 7 is a diagram for explaining, in detail, a signal production method in a case where a phase difference is a threshold or less.

It is possible to produce the digital signal 2 as indicated by the solid line 508 in a bottom section of FIG. 6 as a signal with a phase that is delayed by 120 degrees where T1 to T6 are produced by using the digital signal 505 of the main sensor 11 and the digital signal 1 of the auxiliary sensor 12 similarly to a case of FIG. 4. A method that produces the driving signals HU, LU, HV, LV, HW, LW by using the digital signal 505 of the main sensor 11, the digital signal 1 that is produced from the output signal 502 of the auxiliary sensor 12, and the digital signal 2 is similar to that of an example of FIG. 3 and hence is omitted.

Figure 8:
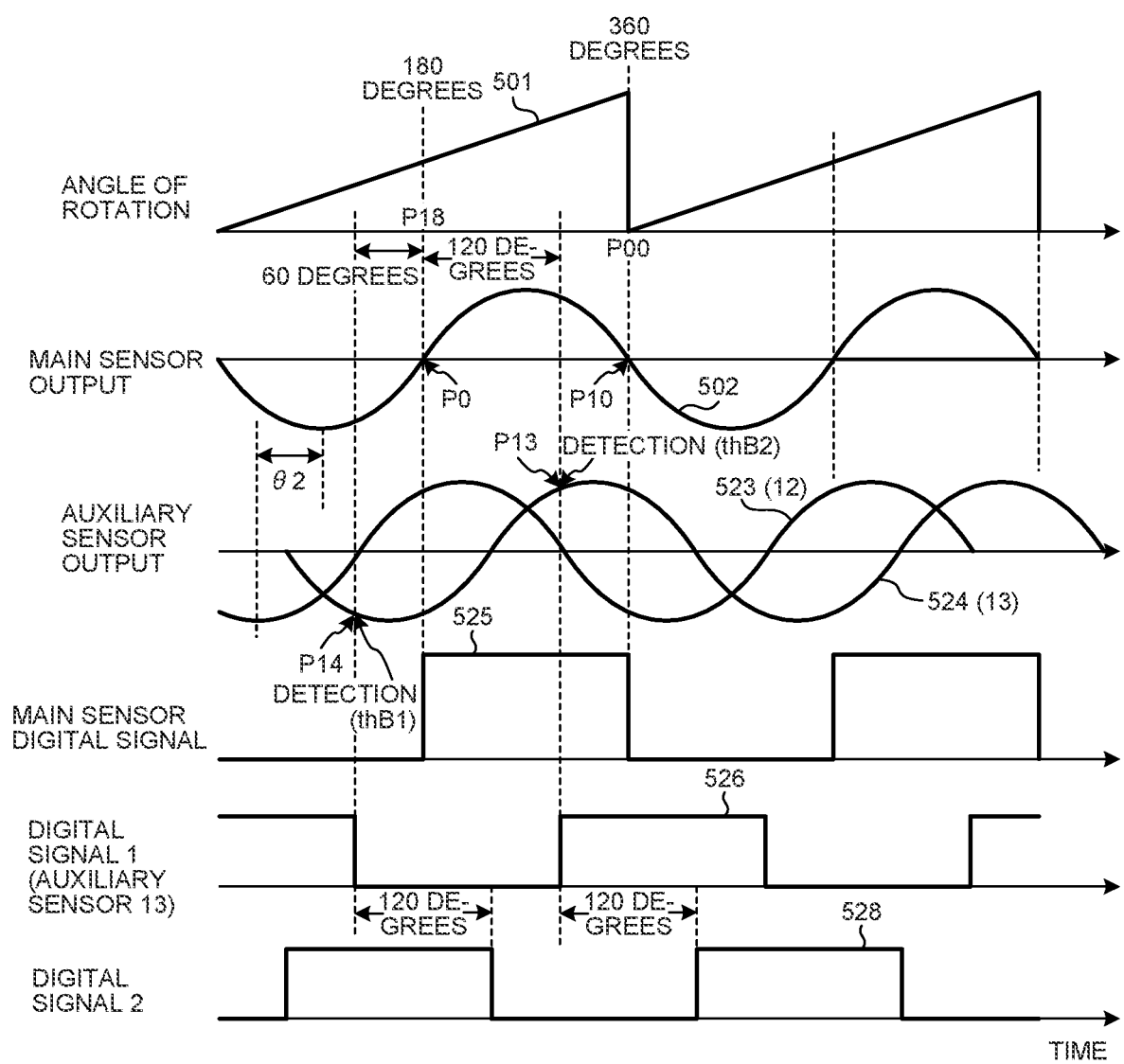
FIG. 8 is a diagram for explaining a signal production method in a case where a phase difference is greater than a threshold.
Figure 9:
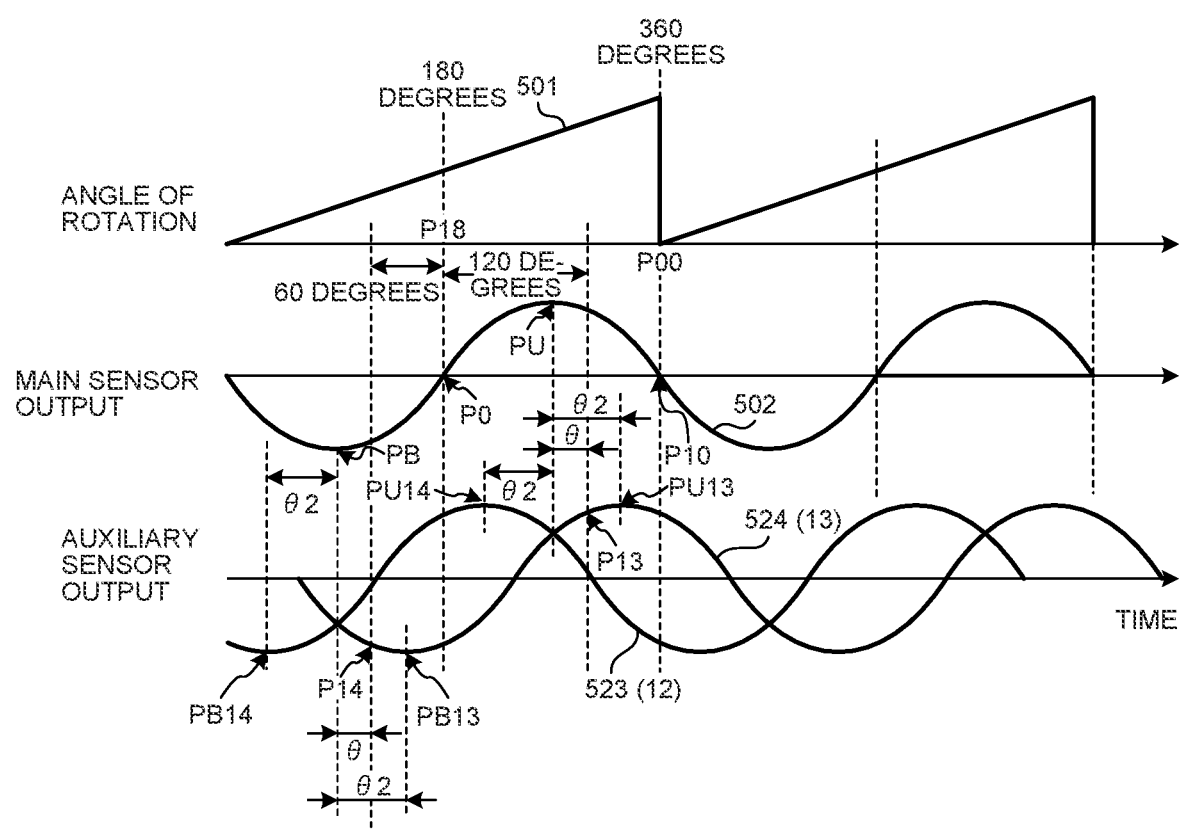
FIG. 9 is a diagram for explaining, in detail, a signal production method in a case where a phase difference is greater than a threshold.

A signal production method in a case where a phase difference between an output signal of the main sensor 11 and an output signal of the auxiliary sensor 12 at a time of normal rotation of the rotor 62 is greater than a threshold will be explained by using FIG. 8 and FIG. 9. FIG. 9 is a diagram that enlarges and illustrates a top section to a third section of FIG. 8.

The timing PB when the output signal 502 of the main sensor 11 is provided at a bottom value is positioned at a timing that is advanced by 90 degrees relative to the timing P18 when an angle of rotation of the main sensor 11 is 180 degrees, and the timing PU when it is provided at a peak value is positioned at a timing that is delayed by 90 degrees relative thereto. Therefore, in a case where a phase difference θ2 between the timing PU when the output signal 502 of the main sensor 11 is provided at a peak value and a timing PU14 when an output signal 523 of the auxiliary sensor 12 is provided at a peak value or between the timing PB when the output signal 502 of the main sensor 11 is provided at a bottom value and a timing PB14 when that of the auxiliary sensor 12 is provided at a bottom value is greater than 30 degrees, a timing P14 of an output signal 524 of the auxiliary sensor 13 that is advanced by 60 degrees relative to the timing P0 when the output signal 502 of the main sensor 11 is zero is present at a predetermined position before reaching a timing PB13 when the output signal 524 of the auxiliary sensor 13 is provided at a bottom value. Similarly, a timing P13 when a phase of the output signal 524 of the auxiliary sensor 13 is delayed by 120 degrees relative to the timing P0 when the output signal 502 of the main sensor 11 is zero is present at a predetermined position before reaching a timing PU13 when the output signal 524 of the auxiliary sensor 13 reaches a peak value.

Therefore, in a case where a phase difference is greater than 30 degrees, the auxiliary sensor 13 is selected and the output signal 524 of the auxiliary sensor 13 is compared with the threshold voltages thB1, thB2 that are set at a time of calibration, so that it is possible to detect rotational positions of the rotor 62 at the timing P14 when a phase thereof is advanced by 60 degrees relative to the timing P18 when an angle of rotation of the main sensor 11 is 180 degrees and the timing P13 when a phase thereof is delayed by 120 degrees relative thereto. A configuration where a bottom value and a peak value of the output signal 524 of the auxiliary sensor 13 are detected does not have to be provided, so that it is possible to simplify a circuit configuration. For example, it is possible to provide the comparator 24 that obtains a digital signal 526 from the auxiliary sensor 13 and is composed of a window comparator that compares the output signal 524 of the auxiliary sensor 13 with the two threshold voltages thB1, thB2.

In a case where the phase difference θ2 between output signals of the main sensor 11 and the auxiliary sensor 12 is greater than a threshold of 30 degrees, the digital signal 1 is produced by using the output signal 524 of the auxiliary sensor 13. It is possible to produce the digital signal 2 as indicated by a solid line 528 as a signal with a phase that is delayed by 120 degrees relative to the digital signal 1 by executing an arithmetic process of the digital signal 1. Additionally, similarly to a case of FIG. 4, the digital signal 2 may be produced by measuring a time that corresponds to a phase difference of 60 degrees relative to the digital signal 1 of the auxiliary sensor 13 by also using information of a digital signal 525 of the main sensor 11, and executing an arithmetic process by using such a measurement value.

Additionally, as described, the auxiliary sensors 12, 13 are arranged at line-symmetric positions relative to the main sensor 11, so that a phase difference that is identical to the phase difference θ2 between output signals of the main sensor 11 and the auxiliary sensor 12 is produced between the output signal 502 of the main sensor 11 and the output signal 524 of the auxiliary sensor 13.

Figure 10:
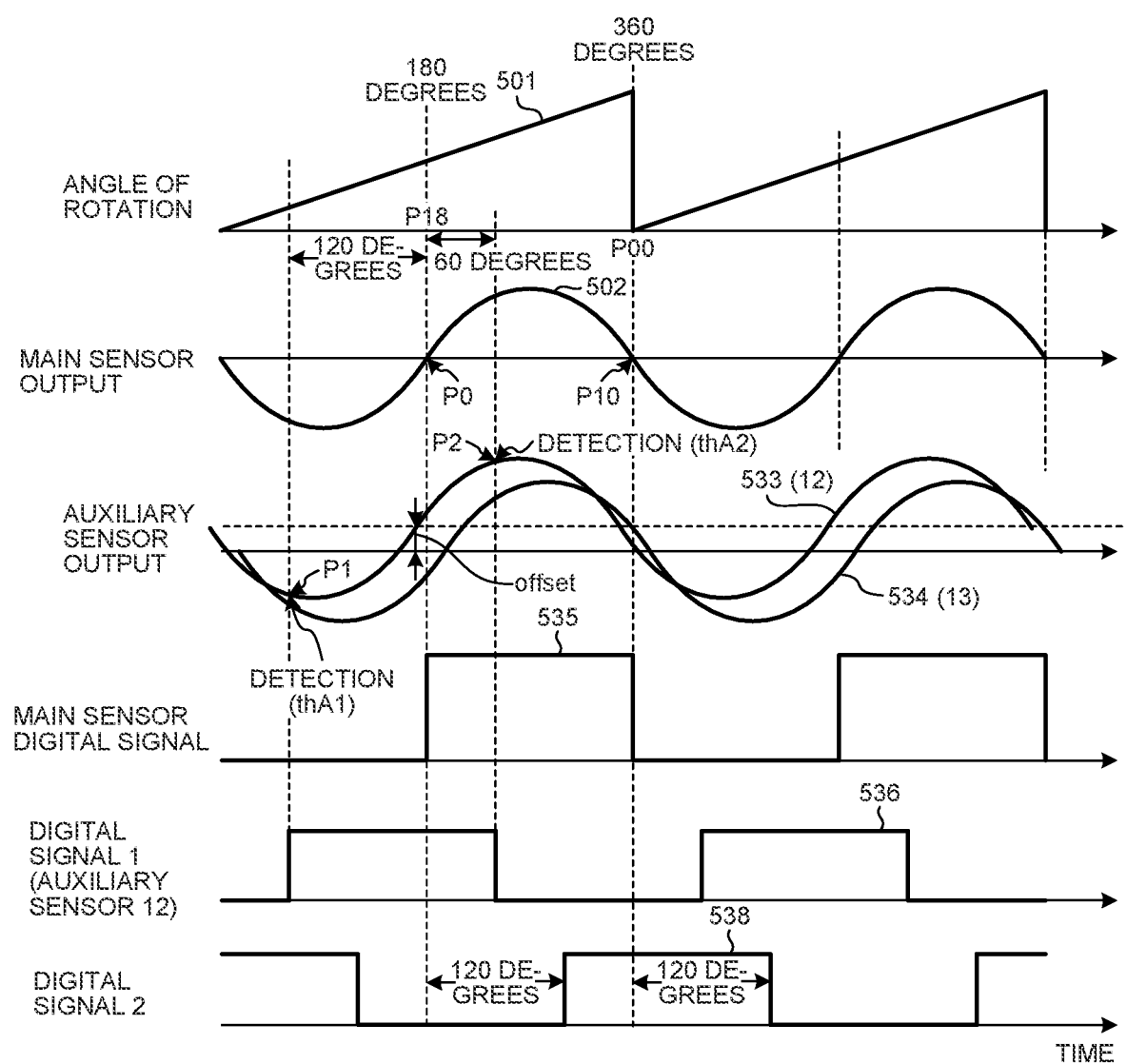
FIG. 10 is a diagram for explaining an offset of an output signal of an auxiliary sensor and a signal production method thereof.

FIG. 10 is a diagram for explaining signal production in a case where an offset is present in output signals of the auxiliary sensors 12, 13. An example of a case where an offset offset is present in an output signal 533 of the auxiliary sensor 12 at a time of normal rotation of the rotor 62 is provided. As described, the threshold voltages thA1, thA2 are set based on values of the output signal 533 of the auxiliary sensor 12 at the predetermined timings P1, P2 that are acquired in calibration that is executed at a time of motor activation. A value of the output signal 533 of the auxiliary sensor 12 at the timing P1 that is advanced by 120 degrees relative to a rotational angle of the rotor 62 that is 180 degrees is set as the threshold voltage thA1 and a value of the output signal 533 at the timing P2 at an angle of rotation that is delayed by 60 degrees relative thereto is set as the threshold voltage thA2. The digital signal 1 that is indicated by a solid line 536 is produced depending on results of comparison of the output signal 533 of the auxiliary sensor 12 with the threshold voltages thA1, thA2. The digital signal 2 that is indicated by a solid line 538 is produced by using a digital signal 535 that is produced from the output signal 502 of the main sensor 11.

In the present embodiment, the threshold voltages thA1, thA2 are set depending on an offset offset of the auxiliary sensor 12. Similarly, the threshold voltages thB1, thB2 of the comparator 24 where an output signal 534 of the auxiliary sensor 13 is supplied thereto are also set by the output signal 534 that is dependent on an offset of the auxiliary sensor 13. It is possible to set the threshold voltages thA1, thA2, thB1, thB2 of the comparators 23, 24 depending on an offset, so that an offset cancel part does not have to be provided for the auxiliary sensor 12, 13. Therefore, it is possible to simplify a circuit configuration. Additionally, similarly to a case of FIG. 4, the digital signal 2 may be produced by measuring a time that corresponds to a phase difference of 60 degrees relative to the digital signal 1 of the auxiliary sensor 12 by also using information of the digital signal 535 of the main sensor 11, and executing an arithmetic process by using such a measurement value.

Figure 11:
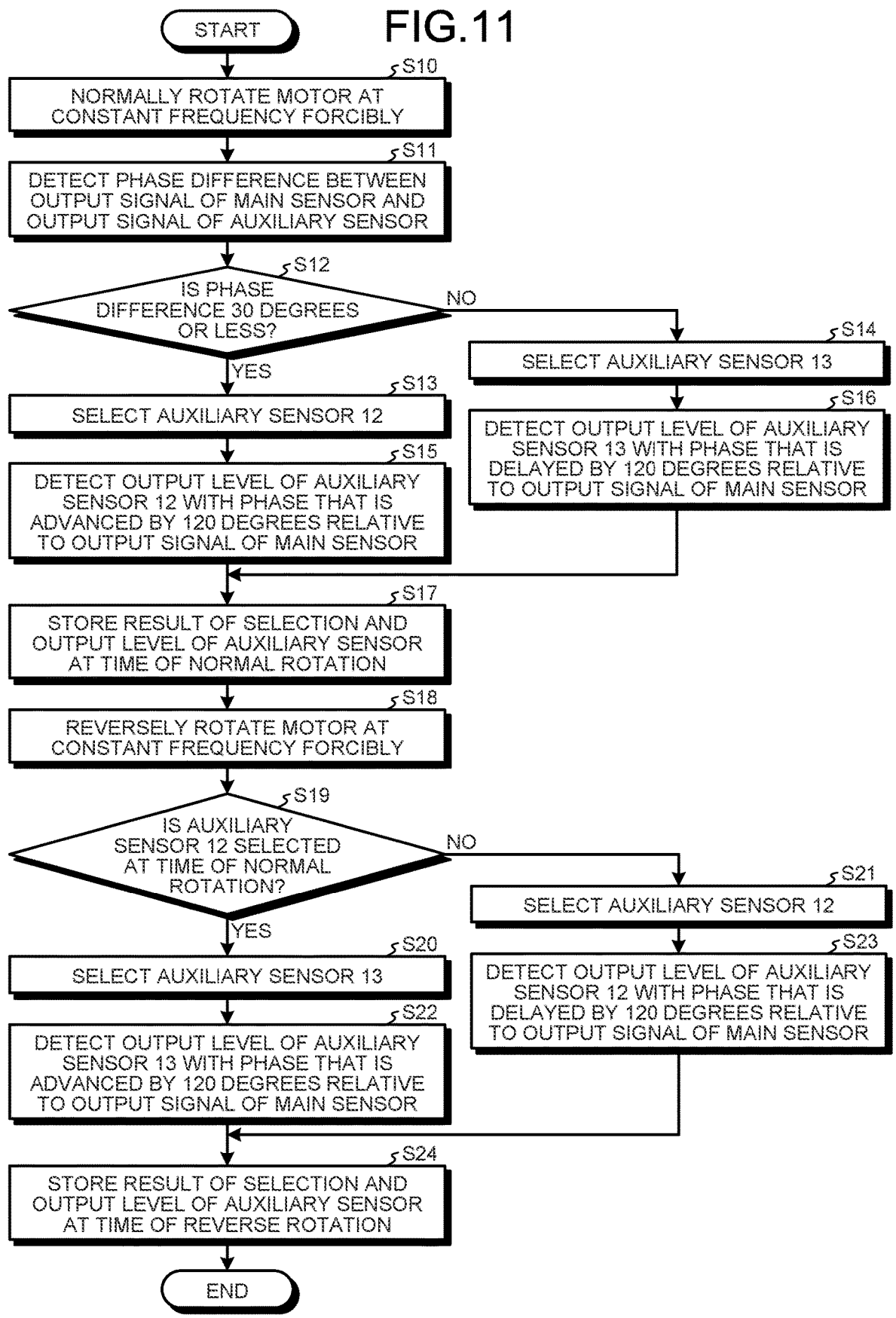
FIG. 11 is a diagram that illustrates a flow of one embodiment of calibration.

FIG. 11 is a diagram that illustrates a flow of one embodiment of calibration. The motor 60 is normally rotated at a constant frequency forcibly (S10). A driving signal with a predetermined pattern that normally rotates the motor 60 at a constant frequency (rotational frequency) forcibly is produced in the driving signal production part 35 and is supplied to the respective output transistors 41 to 46 of the output circuit part 40. Original data of a predetermined pattern are stored in, for example, the memory part 50 and are supplied to the driving signal production part 35 at a predetermined timing through the signal processing part 31. Original data may be supplied from an outside of the driving device 100.

A phase difference between an output signal of the main sensor 11 and an output signal of the auxiliary sensor 12 is detected (S11). For example, a phase difference between peak values of output signals of the main sensor 11 and the auxiliary sensor 12 is detected. A phase difference between peak values is detected, so that, for example, it is possible to exclude an influence in a case where an offset is present in an output signal of the auxiliary sensor 12.

Whether or not a phase difference is 30 degrees that is a threshold or less is determined (S12). In a case where a phase difference is 30 degrees or less (S12: Yes), the auxiliary sensor 12 is selected (S13). That is, the auxiliary sensor 12 that is advanced at a time of normal rotation of the rotor 62 is selected and an output level of an output signal of the auxiliary sensor 12 with a phase that is advanced by 120 degrees relative to an output signal of the main sensor 11 is detected (S15).

In a case where a phase difference is greater than 30 degrees (S12: No), the auxiliary sensor 13 is selected (S14). That is, the auxiliary sensor 13 that follows the main sensor 11 at a time of normal rotation of the rotor 62 is selected and an output level of an output signal of the auxiliary sensor 13 with a phase that is delayed by 120 degrees relative to an output signal of the main sensor 11 is detected (S16).

A result of selection and an output level of an auxiliary sensor at a time of normal rotation of the rotor 60 are stored in a memory of the memory part 50 (S17). A stored detection level is set as a threshold voltage of a comparator.

Then, the motor 60 is reversely rotated at a constant frequency forcibly (S18). Control is executed in such a manner that a driving signal with a predetermined pattern that reversely rotates the motor 60 at a constant frequency (rotational frequency) forcibly is produced in the driving signal production part 35 and is supplied to the respective output transistors 41 to 46 of the output circuit part 40. Original data that are provided as a base of a predetermine pattern are stored in the memory part 50 and are supplied to the driving signal production part 35 at a predetermined timing through the signal processing part 31. A reason why a step of executing reverse rotation forcibly is provided is to prepare for a case where the motor 60 is reversely rotated.

In a case where the auxiliary sensor 12 is selected at a time of normal rotation of the rotor 60 (S19: Yes), that is, a case where a phase difference between output signals of the main sensor 11 and the auxiliary sensor 12 is 30 degrees or less, the auxiliary sensor 13 is selected (S20) and an output level of an output signal of the auxiliary sensor 13 with a phase that is advanced by 120 degrees relative to an output of the main sensor 11 is detected (S22). Thereby, as explained in FIG. 5, a detection level (thB2) at the timing P3 before an output level of an output signal of the auxiliary sensor 13 reaches a peak value and an output level (thB1) of an output signal at the timing P4 before it reaches a bottom value are detected, so that it is possible to detect them as setting values of threshold voltages of the comparator 24.

In a case where the auxiliary sensor 12 is not selected at a time of normal rotation of the motor 60 (S19: No), the auxiliary sensor 12 is selected (S21) and an output level of an output signal of the auxiliary sensor 12 with a phase that is delayed by 120 degrees relative to an output of the main sensor 11 is detected (S23). Thereby, it is possible to detect a value before an output level of an output signal of the auxiliary sensor 12 reaches a bottom value and a value before it reaches a peak value, as setting values of the threshold voltages thA1, thA2 of the comparator 23.

A result of selection and an output level of an auxiliary sensor at a time of reverse rotation of the motor 60 are stored in a memory of the memory part 50 (S24). Stored output levels are set as the threshold voltages thA1, thA2, thB1, thB2 of the comparators 23, 24.

For example, calibration is automatically executed at a time of motor activation, so that threshold voltages of the respective comparators 23, 24 are set. Output signal of the respective auxiliary sensors 12, 13 are compared with respective threshold voltages so as to detect timings when the respective threshold voltages are reached, so that it is possible to detect a rotational position of the rotor 62. Additionally, a driving signal in calibration at a time of activation may be supplied from an outside of the driving device 100 to the output circuit part 40.

Figure 12:
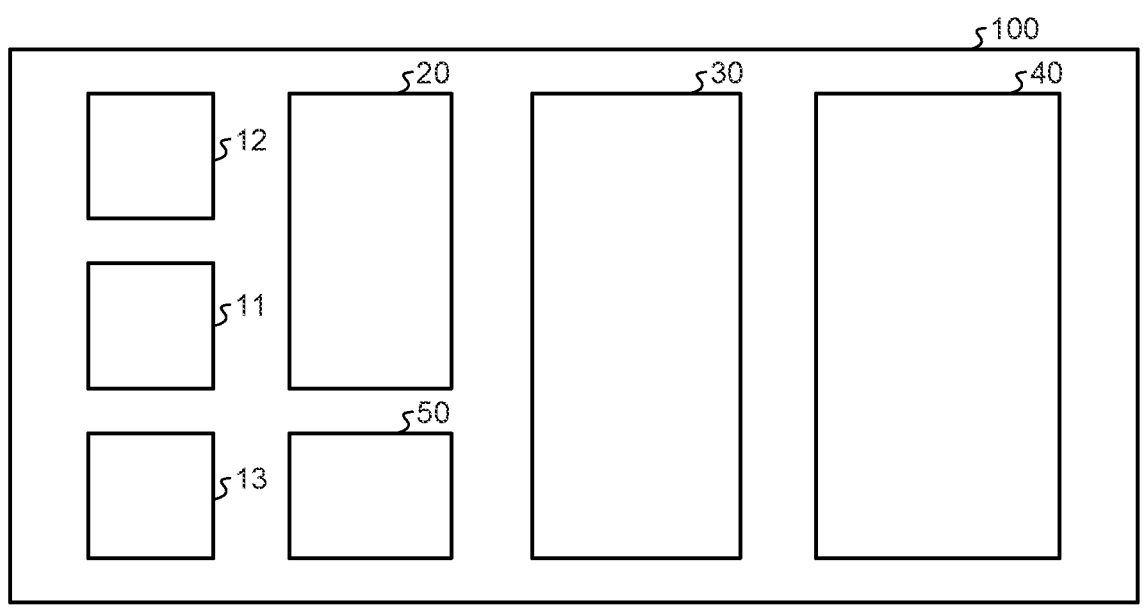
FIG. 12 is a diagram that illustrates an example of a plane pattern where a brushless motor driving device is integrated therein.

FIG. 12 is a diagram that illustrates an example of a plane pattern where the driving device 100 is integrated. In the driving device 100, the main sensor 11, the auxiliary sensors 12, 13, the detection part 20, the control part 30, the output circuit part 40, and the memory part 50 are integrally integrated. The auxiliary sensors 12, 13 are formed on both sides of the main sensor 11. The auxiliary sensors 12, 13 are provided on both sides of the main sensor 11, so that it is possible to provide a configuration where a rotational position of the rotor 62 is detected so as to precede or follow the main sensor 11 depending on rotation of the rotor 62.

In a case where the main sensor 11 and the auxiliary sensors 12, 13 are formed of silicon, for example, it is possible to form it on a single silicon substrate integrally together with the detection part 20, the control part 30, the output circuit part 40, and the memory part 50 and integrally integrate them by a mold resin.

In a case where Hall elements that compose the respective sensors 11, 12, 13 are composed of a compound semiconductor, it is possible to integrate separate chips (non-illustrated) where Hall elements that are composed of a compound semiconductor are formed, with a silicon substrate where other circuit parts are formed, by a multichip configuration, and integrally integrate them by, for example, a mold resin. Furthermore, a part of components may be composed of other integrated circuits as external ones. For example, the output transistors 41 to 46 that compose the output circuit part 40 are composed of high-voltage Double Diffused MOS (DMOS) transistors and are involved with heat generation, so that they may be configured as an external integrated circuit device.

Figure 13:
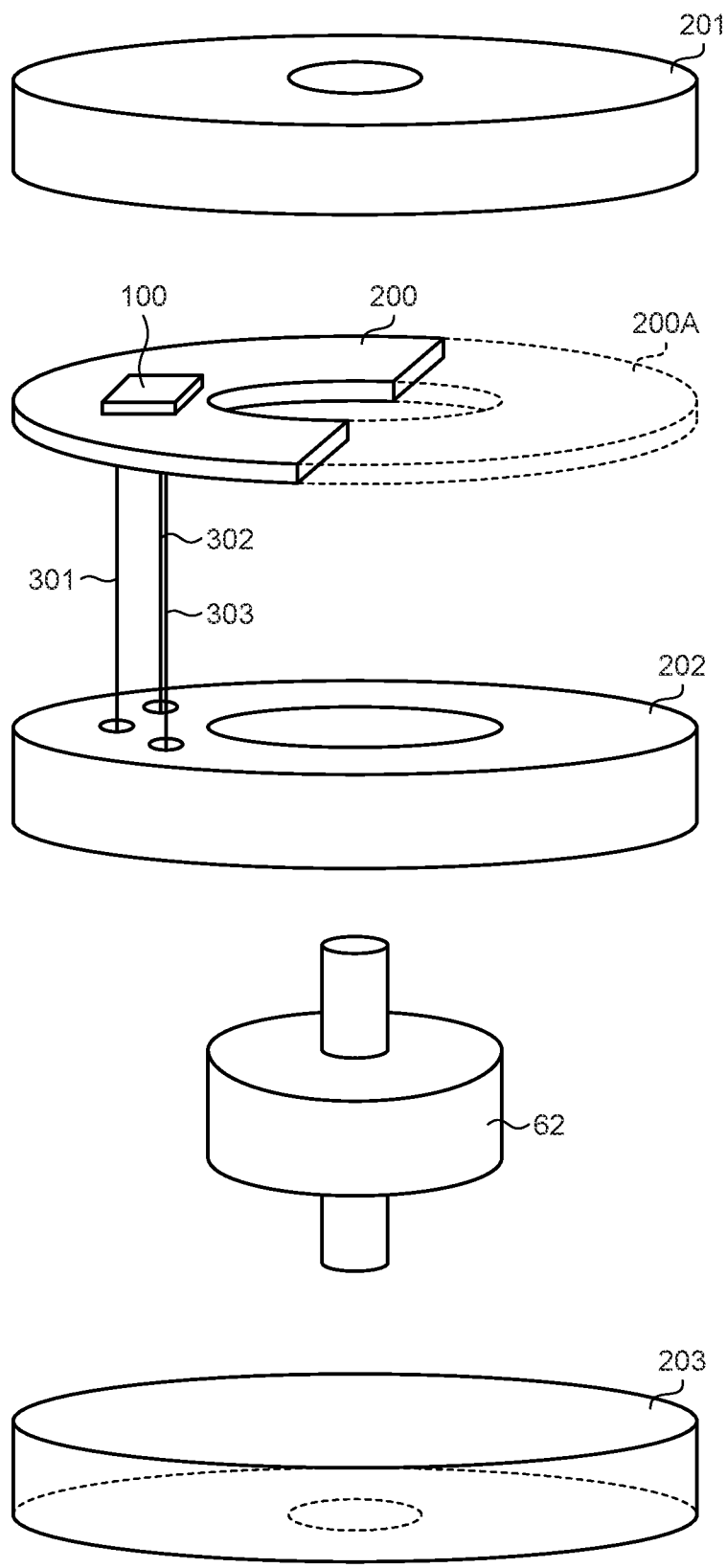
FIG. 13 is an exploded perspective view of one embodiment of a motor that incorporates a brushless motor driving device therein.

FIG. 13 is an exploded perspective view of one embodiment of a motor that incorporates the driving device 100. The driving device 100 is mounted on a support base 200. An exciting coil (non-illustrated) is provided on a stator 202 and an exciting current is supplied thereto through the output lines 301 to 303.

The rotor 62 that is composed of a permanent magnet, the stator 202, and the support base 200 are housed by an upper housing 201 and a lower housing 203.

A configuration where the driving device 100 is provided in such a manner that the main sensor 11 and the auxiliary sensors 12, 13 are integrally integrated is provided, so that it is possible to eliminate a right side part 200A of the support base 200 as indicated by a dotted line. Thereby, it is possible to reduce a cost of a motor. For example, it is possible to divide a flat plate with a ring shape (non-illustrated) into halves so as to provide semi-ring shapes, use one of them as the support base 200, and use the other as a support base of another motor. The driving device 100 where the main sensor 11 and the auxiliary sensors 12, 13 are integrally integrated is provided, so that it is possible to reduce a cost of a motor.

Although a case where the rotor 62 is of two poles has been explained in an embodiment as described, it is possible to detect a rotational position of the rotor 62 by similarly using the driving device 100 even in a case where the rotor 62 is of four poles, eight poles, or the like.

Although some embodiments of the present invention have been explained, these embodiments are presented as examples and do not intend to limit the scope of the invention. These novel embodiments are capable of being implemented in various other modes and it is possible to execute a variety of omissions, substitutions, and modifications without departing from the spirit of the invention. These embodiments and/or variations thereof are included in the scope and/or spirit of the invention and are included in the scope of the invention as recited in what is claimed and equivalents thereof.

What is claimed is:

1. A brushless motor driving device comprising:
   an output part that supplies an excitation current to an excitation coil that generates a magnetic field that rotates a rotor;
   a position detection part including a first detection element, a second detection element, and a third detection element, each being disposed to face the rotor, the position detection part detecting a rotational position of the rotor on the basis of output signals from the first to third detection elements, the output signals being output in response to approaching part of the rotor having a specific magnetic pole; and a driving control part that produces a driving signal based on a detection signal from the position detection part and supplies the driving signal to the output part, wherein the first to third detection elements and the driving control part are integrally provided on a surface of a substrate, the second detection element is provided at a position where the second detection element outputs the output signal preceding the output signal from the first detection element, the third detection element is provided at a position where the third detection element outputs the output signal following the output signal from the first detection element, and the driving control part, at a time of normal rotation of the rotor, produces the driving signal by using a detection signal of the first detection element and a detection signal of the second detection element in a case where a phase difference between the detection signal of the first detection element and the detection signal of the second detection element is a predetermined threshold or less, or produces the driving signal by using a detection signal of the first detection element and a detection signal of the third detection element in a case where a phase difference between the detection signal of the first detection element and the detection signal of the second detection element is greater than the predetermined threshold.

2. The brushless motor driving device according to claim 1, wherein the first detection element is provided at a position where a first center line passing through a center of the first detection element passes through a center of the rotor, and the second detection element and the third detection element are provided at line-symmetric positions relative to the first center line.

3. The brushless motor driving device according to claim 2, wherein the second detection element and the third detection element are provided at positions where a first angle and a second angle with respect to the first center line are equal to one another, the first angle is an angle between the first center line and a second center line, the second center line passing through a center of the second detection element and the center of the rotor, and the second angle is an angle between the first center line and a third center line, the third center line passing through a center of the third detection element and the center of the rotor.

4. The brushless motor driving device according to claim 1, wherein the predetermined threshold is 30 degrees.

5. The brushless motor driving device according to claim 1, wherein the driving control part produces the driving signal by using the detection signal of the first detection element and the detection signal of the third detection element at a time of reverse rotation of the rotor, in a case where the driving signal is produced by using the detection signal of the first detection element and the detection signal of the second detection element at a time of normal rotation of the rotor.

6. The brushless motor driving device according to claim 1, further comprising a threshold voltage production part that sets detection levels for a detection signal of the second detection element and a detection signal of the third detection element.

7. The brushless motor driving device according to claim 6, further comprising:

a first comparator that compares a level of a detection signal of the second detection element and the detection level that is set by the threshold voltage production part for the detection signal of the second detection element; and a second comparator that compares a level of a detection signal of the third detection element and the detection level that is set by the threshold voltage production part for the detection signal of the third detection element.

8. The brushless motor driving device according to claim 1, further comprising an offset cancel part that is provided on the first detection element, wherein the first to third detection elements and the driving control part are integrated by a mold resin.

9. A brushless motor comprising:

a rotor;

a brushless driving device including an output part that supplies an excitation current to an excitation coil that generates a magnetic field that rotates the rotor, a position detection part including a first detection element, a second detection element, and a third detection element, each being disposed to face the rotor, the position detection part detecting a rotational position of the rotor on the basis of output signals from the first to third detection elements, the output signals being output in response to approaching part of the rotor having a specific magnetic pole, and a driving control part that produces a driving signal based on a detection signal from the position detection part and supplies the driving signal to the output part; and a support base that supports the brushless driving device, the support base being composed of a flat plate with a semi-ring shape, wherein the first to third detection elements and the driving control part are integrally provided on a surface of a substrate, the second detection element is provided at a position where the second detection element outputs the output signal preceding the output signal from the first detection element, and the third detection element is provided at a position where the third detection element outputs the output signal following the output signal from the first detection element.

10. The brushless motor according to claim 9, wherein the first detection element is provided at a position where a first center line passing through a center of the first detection element passes through a center of the rotor, and the second detection element and the third detection element are provided at line-symmetric positions relative to the first center line.

11. The brushless motor according to claim 10, wherein
the second detection element and the third detection element are provided at positions where a first angle and a second angle with respect to the first center line are equal to one another,
the first angle is an angle between the first center line and a second center line, the second center line passing through a center of the second detection element and the center of the rotor, and
the second angle is an angle between the first center line and a third center line, the third center line passing through a center of the third detection element and the center of the rotor.

12. The brushless motor according to claim 9, further comprising an offset cancel part that is provided on the first detection element.

13. A brushless motor driving device comprising:
an output part that supplies an excitation current to an excitation coil that generates a magnetic field that rotates a rotor;
a position detection part including a first detection element, a second detection element, and a third detection element, each being disposed to face the rotor, the position detection part detecting a rotational position of the rotor on the basis of output signals from the first to third detection elements, the output signals being output in response to approaching part of the rotor having a specific magnetic pole;
a driving control part that produces a driving signal based on a detection signal from the position detection part and supplies the driving signal to the output part; and
a memory part that holds values of detection signals of the second and third detection elements that are obtained in calibration where the rotor is rotated under a preliminarily set condition, wherein
the first to third detection elements and the driving control part are integrally provided on a surface of a substrate,
the second detection element is provided at a position where the second detection element outputs the output signal preceding the output signal from the first detection element, and
the third detection element is provided at a position where the third detection element outputs the output signal following the output signal from the first detection element.

14. The brushless motor driving device according to claim 13, wherein
the first detection element is provided at a position where a first center line passing through a center of the first detection element passes through a center of the rotor, and
the second detection element and the third detection element are provided at line-symmetric positions relative to the first center line.

15. The brushless motor driving device according to claim 14, wherein
the second detection element and the third detection element are provided at positions where a first angle and a second angle with respect to the first center line are equal to one another,
the first angle is an angle between the first center line and a second center line, the second center line passing through a center of the second detection element and the center of the rotor, and
the second angle is an angle between the first center line and a third center line, the third center line passing through a center of the third detection element and the center of the rotor.

16. The brushless motor driving device according to claim 13, wherein
the driving control part, at a time of normal rotation of the rotor,
produces the driving signal by using a detection signal of the first detection element and a detection signal of the second detection element in a case where a phase difference between the detection signal of the first detection element and the detection signal of the second detection element is a predetermined threshold or less, or
produces the driving signal by using a detection signal of the first detection element and a detection signal of the third detection element in a case where a phase difference between the detection signal of the first detection element and the detection signal of the second detection element is greater than the predetermined threshold.

17. The brushless motor driving device according to claim 16, wherein the predetermined threshold is 30 degrees.

18. The brushless motor driving device according to claim 16, wherein the driving control part produces the driving signal by using the detection signal of the first detection element and the detection signal of the third detection element at a time of reverse rotation of the rotor, in a case where the driving signal is produced by using the detection signal of the first detection element and the detection signal of the second detection element at a time of normal rotation of the rotor.

19. The brushless motor driving device according to claim 13, further comprising a threshold voltage production part that sets detection levels for a detection signal of the second detection element and a detection signal of the third detection element.

20. The brushless motor driving device according to claim 19, further comprising:
a first comparator that compares a level of a detection signal of the second detection element and the detection level that is set by the threshold voltage production part for the detection signal of the second detection element; and
a second comparator that compares a level of a detection signal of the third detection element and the detection level that is set by the threshold voltage production part for the detection signal of the third detection element.

21. The brushless motor driving device according to claim 13, further comprising an offset cancel part that is provided on the first detection element, wherein
the first to third detection elements and the driving control part are integrated by a mold resin.

* * * * *